US00RE34024E

United States Patent [19]

Kim

[11] E Patent Number: Re. 34,024

[45] Reissued Date of Patent: Aug. 11, 1992

[54] TEAR STRIP OPENING DEVICE

[76] Inventor: Myun H. Kim, 885 9th Ave., Apt. 2G, New York, N.Y. 10019

[21] Appl. No.: 635,942

[22] Filed: Dec. 28, 1990

Related U.S. Patent Documents

Reissue of:

[64] Patent No.: 4,795,035
Issued: Jan. 3, 1989
Appl. No.: 901,744
Filed: Aug. 29, 1986

[51] Int. Cl.[5] ..... B65D 27/38

[52] U.S. Cl. ..... 229/311

[58] Field of Search ..... 206/610, 616, 617, 618, 206/411, 813, 605, 629, 264; 428/343; 229/87.05, 239, 311, 312; 383/206

[56] References Cited

U.S. PATENT DOCUMENTS

| | | | |
|---|---|---|---|
| 900,953 | 10/1908 | Reber | 206/616 |
| 1,006,087 | 10/1911 | Hertzberg | 206/616 |
| 1,032,026 | 7/1912 | Roden | 206/617 |
| 1,136,948 | 4/1915 | Faulkner | 206/618 |
| 1,328,028 | 1/1920 | Ahana | 206/618 |
| 1,335,183 | 3/1920 | Payne | 206/618 |
| 1,978,035 | 10/1934 | Thom | 206/617 |
| 2,321,066 | 6/1943 | Dense et al. | 206/617 |
| 2,396,543 | 3/1946 | Velazquez | 206/605 |
| 2,418,526 | 4/1947 | Reitman | 206/605 |
| 2,517,801 | 8/1950 | Roush | 206/616 |
| 2,565,622 | 8/1951 | Orr | 206/618 |
| 2,771,385 | 11/1956 | Humphner | 206/616 |
| 2,778,562 | 1/1957 | Tilly | 206/605 |
| 2,895,865 | 7/1959 | Humphner | 428/343 |
| 3,011,691 | 12/1961 | McGlynn et al. | 206/605 |
| 3,094,269 | 6/1963 | Schneider | 206/618 |
| 3,616,990 | 11/1971 | Powell | 206/610 |
| 3,653,585 | 4/1972 | Kazaros | 206/618 |
| 3,851,762 | 12/1974 | Liblick | 206/813 |
| 3,873,018 | 3/1975 | Donnay | 428/343 |

FOREIGN PATENT DOCUMENTS

| | | | |
|---|---|---|---|
| 2609520 | 9/1976 | Fed. Rep. of Germany | 206/605 |
| 1194243 | 11/1959 | France | 206/618 |
| 175253 | 5/1961 | Sweden | 206/616 |
| 117001 | 12/1926 | Switzerland | 206/618 |

*Primary Examiner*—Stephen P. Garbe
*Attorney, Agent, or Firm*—Schweitzer Cornman & Gross

[57] ABSTRACT

A device for opening an envelope which comprises a thread adhesively attached to the inside surface of the envelope, and non-tearable strips disposed on opposite sides of the thread and adhesively attached to the outside surface of the envelope, the thread and the strips being disposed substantially parallel to each other whereby when the thread is freed from the envelope and pulled away from the envelope, the envelope can be readily opened with a straight tear line which extends along the surface of the envelope between the non tearable strips.

13 Claims, 2 Drawing Sheets

TEAR STRIP OPENING DEVICE

Matter enclosed in heavy brackets [ ] appears in the original patent but forms no part of this reissue specification; matter printed in italics indicates the additions made by reissue.

CROSS REFERENCE TO RELATED APPLICATION

This application is related to application Ser. Nos. 901,741 and 901,942 filed Aug. 29, 1986; Ser. Nos. 901,744 and 947,966 filed Dec. 30, 1986; Ser. No. 042,787 filed Apr. 27, 1987; Ser. No. 077,443 filed Jul. 24, 1987; and Ser. Nos. 081,239 and 081,240 filed Aug. 4, 1987.

BACKGROUND OF THE INVENTION

The present invention relates to a tear strip opening device and, more particularly, to a package, for example, an envelope containing a thread positioned at the inside thereof along the crease line between adjacent non tearable material ridges attached thereto which is adapted to be used for easily and readily opening the envelope.

Many types of envelopes have been developed in the stationary industry to facilitate the opening of the envelope. For example, envelopes have been designed with dotted punch lines disposed along one end of the envelope. Also, envelopes contain a thread positioned along the bottom thereof. However, these envelopes suffer from a number of disadvantages, such as they are difficult to open easily and, thus, an opening device, such as a paper opener, must be used for opening these envelopes. Also the prior art devices produce zigzag cuts when using thread positioned along the bottom of an envelope for opening the envelope. Furthermore, to place the tear strip containing the thread at positions other than at the bottom crease of an envelope is very difficult.

OBJECTS AND SUMMARY OF THE INVENTION

Accordingly, it is an object of the present invention to provide a tear strip opening device for use in producing a straight opening in an envelope in an easy manner.

Another object of the present invention is to provide an envelope which utilizes a woolen thread tightly pasted thereto to facilitate the easy opening of the envelope.

A further object of the present invention is to provide an envelope containing a thread positioned along any portion of the inside thereof, e.g., along a crease line and disposed between adjacent non tearable material ridges attached thereto. For example, the thread can be positioned along the middle, top or bottom of the envelope where it is sealed with a glue on the inside surface of the paper and the thread is positioned between adjacent non tearable material ridges disposed on the reverse side thereof.

Still a further object of the present invention is to provide an envelope which provides an opening member to facilitate the easy and ready opening of the envelope.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a tear strip device for opening any type of container, such as an envelope which comprises a thread disposed along any surface of the envelope, and parallel non tearable material such as plastic ridges or strips disposed on the reverse side of said surface and on opposite sides of the thread. Advantageously one end of the thread extends through the surface of the envelope and is sealed within a tab (folded sheet) which in turn is sealed to the outside the surface of the envelope. Thus by pulling the tab away by pulling from the outside surface of the envelope, the thread tears the surface of the envelope in the area between the parallel stubs or ridges.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 1:
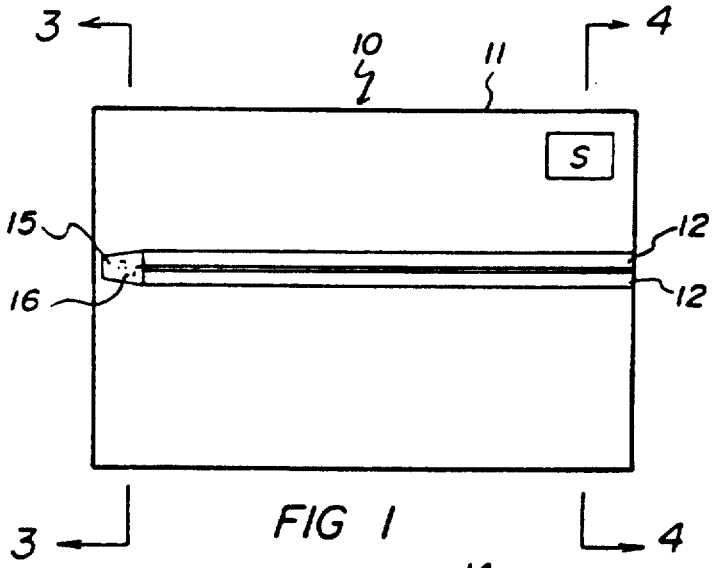
FIG. 1 is a front view of an envelope including the tear strip device disposed at the middle of one side thereof according to the present invention.
Figure 2:
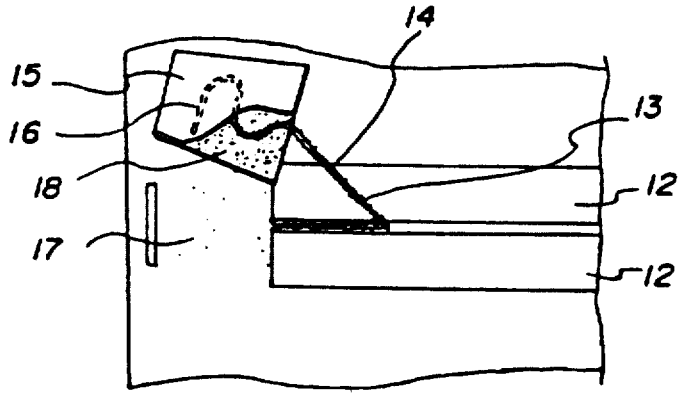
FIG. 2 is an enlarged front view showing an opening tab of the envelope including the tear strip device of the present invention.
Figure 3:
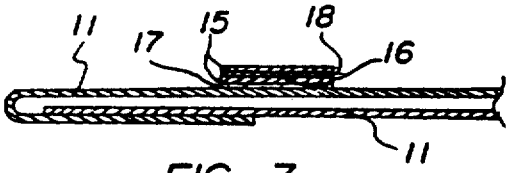
FIG. 3 is a cross-sectional view of a partially torn envelope of FIG. 1, taken along line 3—3.
Figure 4:
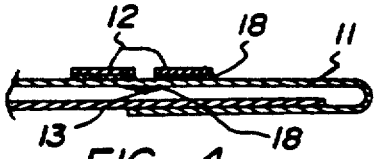
FIG. 4 is a cross-sectional view of FIG. 1, taken along line 4—4.
Figure 5:
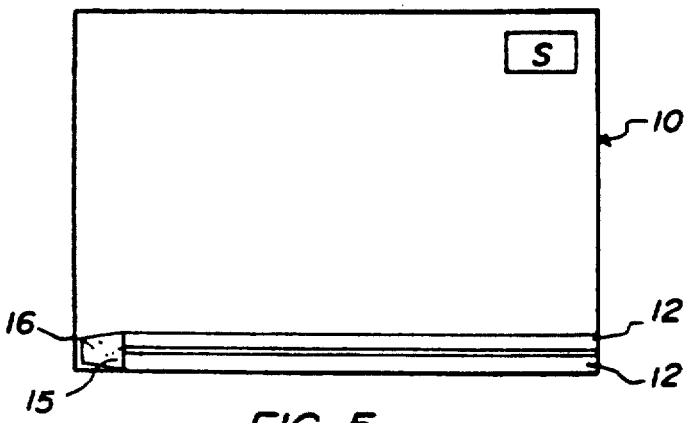
FIG. 5 is a front view of an envelope the tear strip device of the present invention disposed at the lower front surface of the envelope.

Referring in detail to the drawings for the purpose of illustrating the present invention, FIGS. 1, 2 and 5 show an envelope 10 and a thread 13 having a plurality of woolen hairs 14 which is attached by glue 15 to the inside surface of the envelope 10. The thread 13 in the inside of the envelope is positioned between small adjacent non tearable material ridges or strips 12 attached by glue 18 to the outside of the envelope 10 (FIG. 4). The non tearable material such as plastic ridges or strips 12 are disposed substantially parallel to each other and to the thread 13 and on opposite sides of the envelope 11 from the thread 13. One end 16 of the thread 13 extends through the surface of the paper 11 of the envelope and is sealed within a tab 15 (folded sheet) which, in turn, is releasably sealed by an adhesive 17 to the outside surface of the envelope. Advantageously, the tab 15 is provided with a specific configuration to make it readily identifiable. Also, the thread end 16 has a serpentine configuration in the sealed tab 15 to strengthen the attachment of the thread 13 to the tab 15. The thread 13 can be made of any type of material which is sufficiently strong to cut paper products. Suitable thread materials include cotton threads, synthetic threads and the like.

FIG. 5, illustrates the tear strip device which is disposed on the lower portion of the envelope 10.

Figure 6:
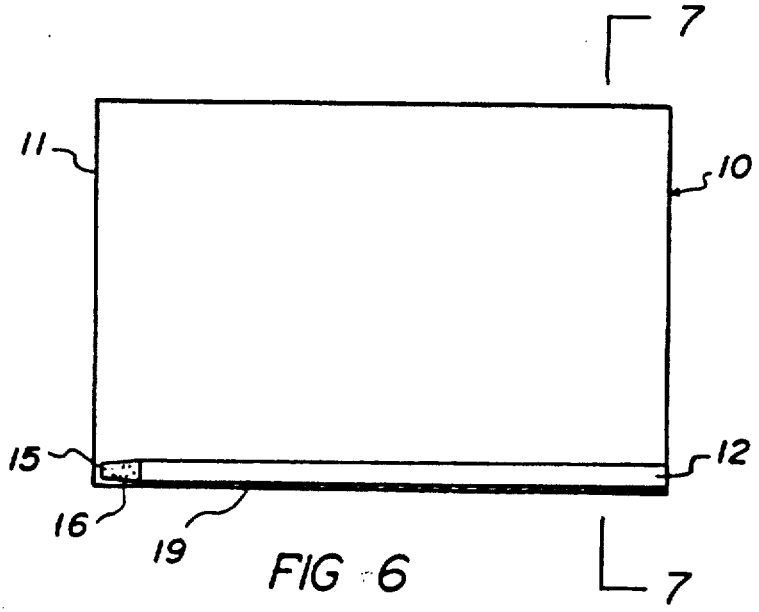
FIG. 6 is a front view of an envelope containing the tear strip device of the present invention disposed at the edge thereof.
Figure 7:
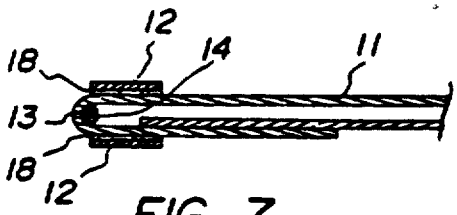
FIG. 7 is a cross-sectional view of FIG. 6, taken along line 7—7.

FIGS. 6 and 7 illustrate another embodiment of the present invention. In this regard, the tear strip device is located along the edge of the envelope 10. The small non tearable material such as plastic ridges or strips 12 are disposed on both sides, that is on the front and back side of the envelope and on opposite sides of the bottom crease line 19 of the envelope 10. The thread 13 containing the woolen hairs 14 is attached by glue 18 along the crease line 19 (FIGS. 6 and 7). Similarly, the plastic strings or ridges 12 are also attached to the front and back side of the envelope by glue 18. The end 16 of the thread 13 extends through the envelope into the tab 15 disposed on one side of the envelope. The tab 15 is, in turn, releasably attached to the surface of the envelope 10. Advantageously, the tab 15 is provided with a specific configuration to make it readily identifiable. Also, the thread end 16 has a serpentine configuration in the sealed tab 15 to strengthen the attachment of the thread to the tab.

Figure 8:
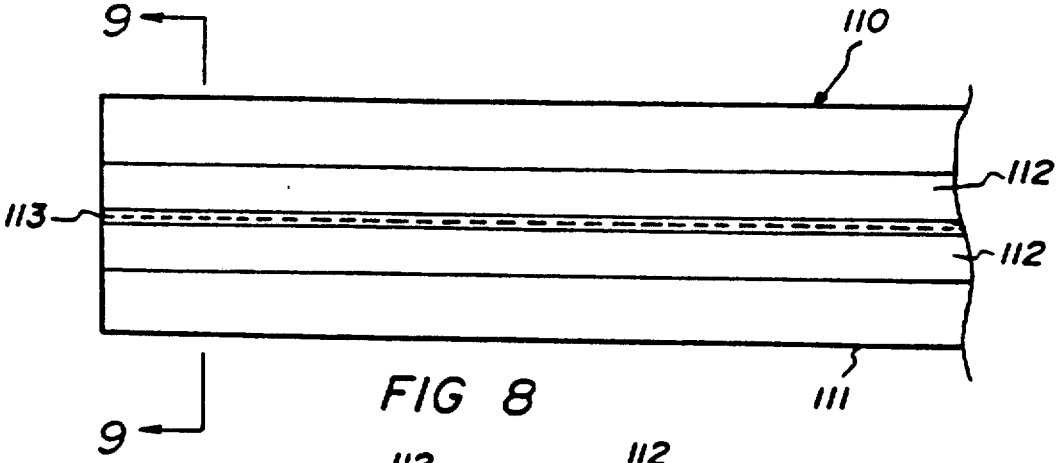
FIG. 8 is a plan view of a sealing tape of another embodiment of the present invention.
Figure 9:
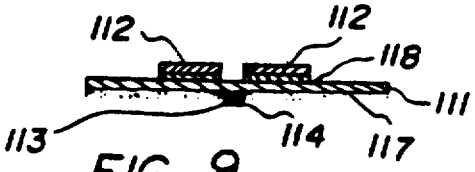
FIG. 9 is a cross-sectional view of FIG. 8, taken along line 9—9.

In still another embodiment as shown in FIGS. 8 and 9, the opening device of the present invention can be used in the form of a sealing tape 110 which can be used to seal packages of various types. Thus a paper sealing tape 110, for example, which contains a dry adhesive 117 on one side thereof can be further provided with a thread 113 which is adhesively attached to the dry adhesive side of the tape 110. The other side 111 of the tape 110 is provided with non tearable material such as plastic ridges 112 which are substantially pasted by glue 118 to the tape 110 and extend along the length of the tape 110. The tape, which can be stored in a roll can be merely unwound and used to seal packages by wetting the dry adhesive 117 and attaching it to the package. When it is later desired to open the package, the thread 113 is freed-up at the free end of the tape 110 and pulled away from the package to tear the sealing tape and thereby open the package.

In operation, the paper 11 to be formed into an envelope 10 is provided with the thread 13 having a plurality of woolen hairs 14 attached by glue 18 to the inside surface of the envelope. Along the outside surface of the envelope 10 on opposite sides of the thread are provided small plastic ridges or strips 12 which are attached by glue 18 to the envelope 10. Thus, the thread 13 and the small plastic ridges or strips 12 are disposed substantially parallel to each other with the thread 13 being on the opposite side of the surface from the plastic ridges 12. When the tab 15 containing one end of thread 13 is pulled away from the envelope 10, a straight tear line is produced in the envelope because of the plastic ridges or strips which prevent the tear line from becoming irregular.

Although the tear strip is shown for opening a letter, it is apparent that it could be utilized for opening any type of container which can be readily cut by the tear strip. Thus, a paper opening device, e.g., a letter opener is never necessary utilizing the present invention.

It is also apparent that the tab 15 can be eliminated as long as there is an effective way of grasping the tear strip.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. [An envelope] *A package* formed of a tearable substrate having an inside surface and an outside *surface* and provided with an opening device which comprises:

a pair of non-tearable straight bands adhesively attached to the outside surface of the tearable substrate, said pair of non-tearable straight bands being adhesively disposed in a pair of substantially straight lines, and a thread containing a plurality of hairs and adhesively disposed as a straight line along the inside surface of the tearable substrate, said thread and said pair of non-tearable bands being disposed substantially parallel to each other such that the thread is disposed between said pair of non-tearable straight bands on the opposite side of the tearable substrate so that, when said thread is freed and pulled away from the [envelope] *package* the [envelope] *package* , is opened with a tear line which extends along the tearable substrate of the [envelope] *package* in a straight line defined by said pair of non-tearable bands.

2. The [envelope] *package* of claim 1 wherein a free end of the thread extends from the inside to the outside of the [envelope] *package* where it is sealed within an opening tab.

3. The [envelope] *package* of claim 2 wherein the opening tab is adhesively attached to the outside surface of the [envelope] *package*.

4. The [envelope] *package* of claim 2 wherein the free end of the thread disposed between the tab has a serpentine configuration of extended length to strengthen the attachment of the free end of the thread to the tab.

5. The [envelope] *package* of claim 2 wherein the tab has a specific configuration to make it clearly identifiable from the outside surface of the [envelope]*package*.

6. The [envelope] *package* of claim 2 wherein *the package is an envelope,* the thread is disposed in the inside bottom crease of the envelope and the non-tearable bands are disposed on the front and rear outside surfaces of the envelope adjacent the bottom crease.

7. The [envelope] *package* of claim 1 wherein the thread is made of cotton.

8. The [envelope] *package* of claim 1 wherein the thread and the non-tearable bands are located along at least one side of the [envelope] *package*.

9. A package sealing tape comprising:

a tape member having a top side and a bottom side, said bottom side being provided with a dry adhesive, a thread member adhesively attached to the middle portion of said bottom side of said tape member and extending in the longitudinal direction thereof, said thread member containing a plurality of hairs, and non-tearable, flexible members adhesively attached to the top side of said tape member and on opposite sides of said thread member, said thread member and said non-tearable, flexible members being disposed substantially parallel with respect to each other, whereby the tape member can be used to seal a package by merely wetting the dry adhesive and furthermore the package can be readily opened by locating the free end of the thread of the end of the tape and pulling the thread away from the package and between the non-tearable, members to produce a straight tear along the longitudinal direction of the sealing tape.

10. The package sealing tape of claim 9 wherein the sealing tape is made of a tearable material.

11. The package sealing tape of claim 10 wherein the tearable material is paper.

12. The package sealing tape of claim 9 wherein the sealing tape is disposed in a roll.

13. The package sealing tape of claim 9 wherein the bottom side is provide with a wet adhesive which is, in turn, further provided with a cover member which can readily be peeled off, thereby exposing the adhesive surface.

* * * * *